US012634754B2

(12) United States Patent
Xu et al.

(10) Patent No.: US 12,634,754 B2
(45) Date of Patent: May 19, 2026

(54) DATA COMPRESSION METHOD, DATA DECOMPRESSION METHOD, AND COMMUNICATION APPARATUS

(71) Applicant: HUAWEI TECHNOLOGIES CO., LTD., Shenzhen (CN)

(72) Inventors: Bo Xu, Shanghai (CN); Zhiqiang Zou, Shanghai (CN); Hua Cai, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 101 days.

(21) Appl. No.: 18/412,574

(22) Filed: Jan. 14, 2024

(65) Prior Publication Data

US 2024/0196268 A1    Jun. 13, 2024

Related U.S. Application Data

(63) Continuation of application No. PCT/CN2022/107820, filed on Jul. 26, 2022.

(30) Foreign Application Priority Data

Aug. 24, 2021    (CN) .......................... 202110975362.2

(51) Int. Cl.
  *H04W 72/04*      (2023.01)
  *H04W 28/06*      (2009.01)
  *H04W 72/21*      (2023.01)
(52) U.S. Cl.
  CPC .................................. *H04W 28/06* (2013.01)
(58) Field of Classification Search
  CPC ........ H04N 19/85; H04N 19/44; G06F 17/30; H04W 28/06; H04W 72/04; H04W 72/21; H04M 7/40; H04M 7/30
  (Continued)

(56) References Cited

U.S. PATENT DOCUMENTS 7,088,276 B1 *   8/2006   Wegener ............... G06F 17/141
                                                            341/51
2002/0124219 A1 *   9/2002   Kuroki ........... G01R 31/318385
                                                            714/739
(Continued)

FOREIGN PATENT DOCUMENTS

WO      2016095577 A1      6/2016
WO      2020122780 A1      6/2020

OTHER PUBLICATIONS

Longsheng Li et al:"Enabling Flexible Link Capacity for eCPRI-Based Fronthaul With Load-Adaptive Quantization Resolution." Aug. 12, 2019. total 12 pages.

*Primary Examiner* — Jude Jean Gilles

(57)      ABSTRACT

Embodiments of this application provide a data compression method, a data decompression method, and a communication apparatus. The communication apparatus may be a baseband unit (BBU), a remote radio unit (RRU), or the like. The method may be used for data compression and decompression. During data compression, the communication apparatus may obtain first data based on N pieces of original data, an amount K of combined data, and a data bit width L of the combined data, where the first data is data obtained by compressing the original data, a data bit width corresponding to the first data is $\beta$, $\beta$ is a non-integer greater than 0, and N, K, and L are positive integers; then determine the combined data based on $\beta$ and the first data; and output the combined data.

20 Claims, 4 Drawing Sheets

BBU 101 — RRU 102

(58) Field of Classification Search
USPC ........................................................ 709/238
See application file for complete search history.

(56)                    References Cited

U.S. PATENT DOCUMENTS

| | | | | |
|---|---|---|---|---|
| 2010/0128979 A1* | 5/2010 | Monaghan | ............. | H04N 19/59 |
| | | | | 382/166 |
| 2010/0305449 A1* | 12/2010 | Wegener | ............. | G01S 7/52034 |
| | | | | 600/459 |
| 2012/0287141 A1* | 11/2012 | Higgins | ................. | H04N 19/98 |
| | | | | 708/203 |
| 2012/0300710 A1* | 11/2012 | Li | ........................ | H04W 88/085 |
| | | | | 370/329 |
| 2017/0269199 A1* | 9/2017 | He | ........................ | G10K 11/341 |
| 2020/0007185 A1* | 1/2020 | Li | ............................ | H04L 27/38 |

* cited by examiner

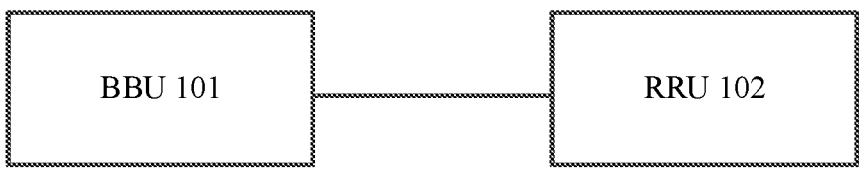

FIG. 1

BBU

RRU

Step 201: The BBU obtains first data based on N pieces of original data, an amount K of combined data, and a data bit width L of the combined data, where the first data is data obtained by compressing the original data, a data bit width corresponding to the first data is $\beta$, $\beta$ is a non-integer greater than 0, and N, K, and L are positive integers Step 202: The BBU determines the combined data based on $\beta$ and the first data Step 203: The BBU outputs the combined data Step 204: The RRU determines the first data based on the data bit width $\beta$ corresponding to the first data and the combined data, where the first data is data obtained by compressing the original data, and $\beta$ is a non-integer greater than 0

Step 205: The RRU determines N pieces of original data based on $\beta$ and the first data, where N is a positive integer

FIG. 2

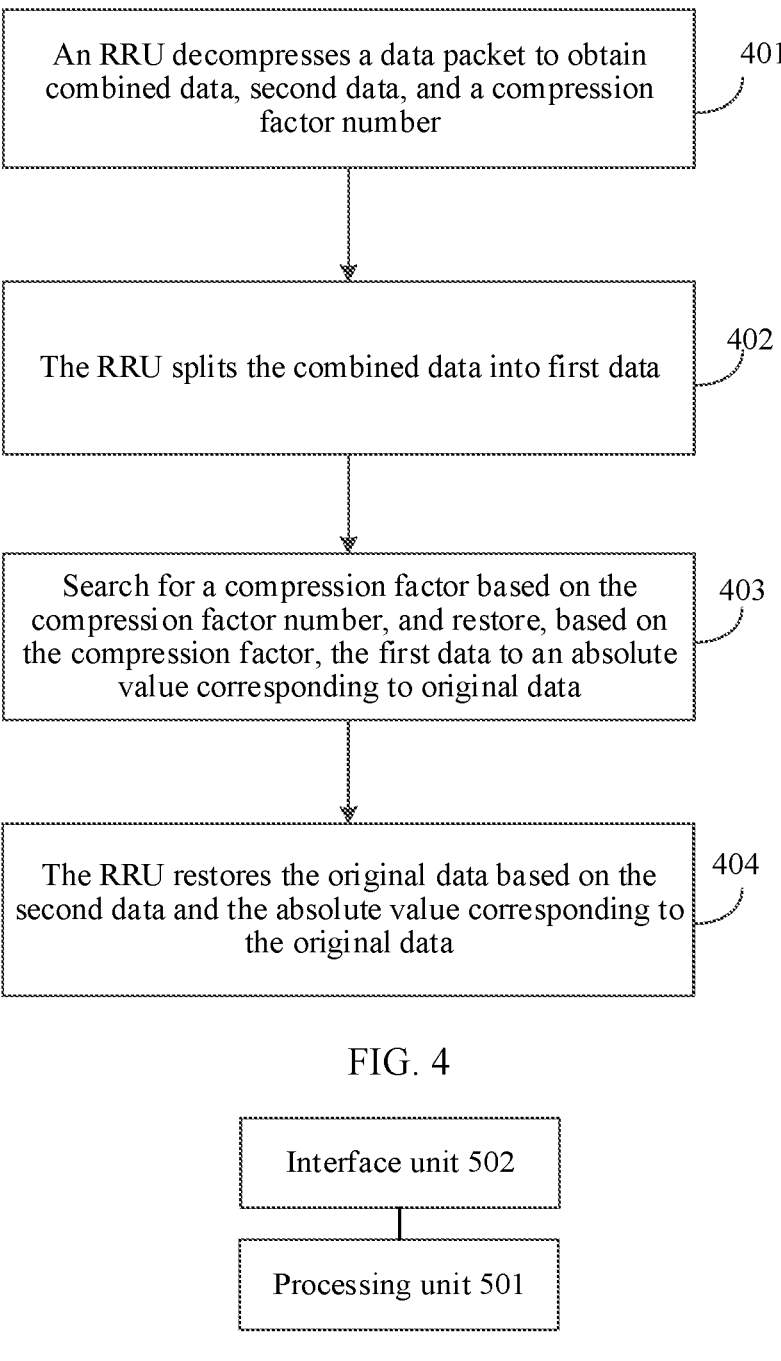

An RRU decompresses a data packet to obtain combined data, second data, and a compression factor number     401

The RRU splits the combined data into first data     402

Search for a compression factor based on the compression factor number, and restore, based on the compression factor, the first data to an absolute value corresponding to original data     403

The RRU restores the original data based on the second data and the absolute value corresponding to the original data     404

FIG. 4

Interface unit 502

Processing unit 501

DATA COMPRESSION METHOD, DATA DECOMPRESSION METHOD, AND COMMUNICATION APPARATUS

CROSS-REFERENCE TO RELATED APPLICATIONS

This application is a continuation of International Application No. PCT/CN2022/107820, filed on Jul. 26, 2022, which claims priority to Chinese Patent Application No. 202110975362.2, filed on Aug. 24, 2021. The disclosures of the aforementioned applications are hereby incorporated by reference in their entireties.

TECHNICAL FIELD

Embodiments of this application relate to the field of communication technologies, and in particular, to a data compression method, a data decompression method, and a communication apparatus.

BACKGROUND

During cellular mobile communication, distributed base stations are widely used. Usually, a baseband unit (baseband unit, BBU) module responsible for baseband digital processing and a remote radio unit (remote radio unit, RRU) module responsible for intermediate radio frequency processing are placed separately in a distributed base station, and a BBU and an RRU exchange data through a common public radio interface (common public radio interface, CPRI). Because the data transmitted between the BBU and the RRU is air interface data, the air interface data has a large data amount and has a high requirement on real-time performance. The CPRI is usually carried by using an optical fiber. However, as a bandwidth and an antenna quantity in wireless communication gradually increase, capacity and cost issues of the optical fiber or an optical module become increasingly prominent. Therefore, CPRI data compression is introduced to reduce costs of laying the optical fiber and the optical module.

Usually, the CPRI between the BBU and the RRU is for transmitting data based on a fixed data bit width. As shown in Table 1 below, three data bit widths are agreed on between a BBU and an RRU, and are respectively 7 bits (bits), 8 bits, and 9 bits. Different data bit widths correspond to different data rates and quantized signal-to-noise ratios (signal-to-noise ratios, SNRs). During actual application, the BBU and the RRU can select only one of the data bit widths for data transmission. However, with a change of cell load and a channel environment, a data fluctuation range is large, and the fixed bit width cannot effectively adapt to fluctuation of signal power.

TABLE 1

| Data bit width (bit) | Sampling rate (MHz) | Antenna quantity | Data rate (Mbps) | Quantized SNR (dB) |
|---|---|---|---|---|
| 7 | 30.72 | 8 | 3440.64 | 40.12 |
| 8 | 30.72 | 8 | 3932.16 | 46.14 |
| 9 | 30.72 | 8 | 4423.68 | 52.16 |

In addition, it can be learned from Table 1 that, a data rate change corresponding to each bit of the data bit width is 491.52 Mbps (=3932.16−3440.64, where if a sampling rate and an antenna quantity change, a corresponding rate of each bit changes), and a quantized SNR change is 6.02 dB (decibels) (46.14−40.12=6.02). It can be learned that the data rate change and the quantized SNR change that correspond to each bit are great.

SUMMARY

This application provides a communication method and apparatus, so that a granularity of a data bit width is finer and better meets a requirement of a device, and a high SNR can be ensured while a data transmission rate is ensured.

According to a first aspect, this application provides a communication method. The method may be performed by an RRU or a BBU, or may be performed by a component (for example, a processor, a chip, or a chip system) of the RRU or the BBU, or may be performed by a logic module or software that can implement all or some functions of the RRU or the BBU. This is not specifically limited in this application.

When the method is performed, first data may be obtained based on N pieces of original data, an amount K of combined data, and a data bit width L of the combined data, where the first data is data obtained by compressing the original data, a data bit width corresponding to the first data is $\beta$, $\beta$ is a non-integer greater than 0, and N, K, and L are positive integers; the combined data is determined based on $\beta$ and the first data; and the combined data is output.

It should be noted that the foregoing original data may be understood as uncompressed data, data stored in a communication apparatus, data collected by a collection apparatus connected to the communication apparatus (where for example, if the communication apparatus is connected to a voltage sensor, and a voltage value collected by the voltage sensor is 36 V (volts), 36 V may be understood as original data), or the like. This is not specifically limited in this application. For example, when data is transmitted between the BBU and the RRU, a large bandwidth is occupied for directly transmitting original data, and a large quantity of optical fiber devices are required to carry the original data, resulting in high costs. In this application, considering a cost issue, the original data may be compressed, and compressed data may be combined to construct combined data for transmission.

During application of this application, considering an actual application environment of the communication apparatus, for example, a supported bandwidth and a data transmission rate, the data bit width L of the combined data may be determined based on the actual application environment of the communication apparatus. The first data may be obtained by performing data processing (weighting, a data operation, and the like) based on the data bit width L, the amount K of combined data, and the N pieces of original data. The first data may be understood as data obtained by compressing the original data. After data processing, the original data is compressed, and the data bit width corresponding to the first data is $\beta$. $\beta$ may be understood as a data bit width corresponding to each piece of first data after a plurality of pieces of first data are combined. For example, first data A and first data B are combined into data C, a data bit width corresponding to the data C is L, and a data bit width corresponding to the first data A may be understood as $\beta$. In addition, it should be further noted that $\beta$ may be data A obtained based on L, K, and N, or may be data obtained by processing the data A. This is not specifically limited in this application. For example, if the data A obtained based on L, K, and N is 6.5, $\beta$ may be 6.5, 6.4, or 6.3, or if the data A obtained based on L, K, and N is ⅓, $\beta$ may be 0.3, 0.33, or the like. This is not specifically limited in this application.

In this application, a granularity of the data bit width may be accurate to a decimal. Compared with a case in which only an integer data bit width is supported, this type of data bit width better meets an actual application requirement of a device, and a high SNR can be ensured while a data transmission rate is ensured.

In an optional manner, the communication apparatus may obtain second data based on the N pieces of original data, where the second data represents positive and negative features of each of the N pieces of original data; and output the combined data and the second data.

It should be noted that the original data has positive and negative values. During data transmission, plus and minus symbols of the original data and numerical values of the data are separated and calculated, so that the combined data that can be obtained is all positive numbers. In addition, during decompression, the combined data may be quickly decompressed, to avoid a calculation error caused by a data symbol participating in calculation. When calculation efficiency is improved, data processing efficiency can be improved.

In an optional manner, $\beta$ satisfies Formula 1, and Formula 1 is as follows:

$$\beta = \frac{L * K}{N} + \sigma \qquad \text{Formula 1}$$

$$\sigma \in [-0.5, 0.5].$$

It should be noted that $\beta$ is a valid bit width in a data transmission process, where a numerical range of the valid bit width is $[0, 2^\beta-1]$. For example, a valid bit width of 6.5 indicates that a numerical range of the valid bit width is $[0, 2^{6.5}-1]$, that is, $[0, 89]$. It can be learned from N/K that one piece of combined data is constructed by using several pieces of original data, and it can be learned from $$\frac{L * K}{N}$$

that a bit width corresponding to one piece of original data after compression and combination may be a non-cyclic or cyclic decimal, and $\beta$ and $\sigma$ may be summed to obtain a non-cyclic decimal. A granularity of the data bit width of $\beta$ determined in this manner may be accurate to a decimal. Compared with a case in which only an integer data bit width is supported, this type of data bit width better meets an actual application requirement of a device, and a high SNR can be ensured while a data transmission rate is ensured.

In an optional manner, the first data satisfies Formula 2, and Formula 2 is as follows:

$$Z_i = \left\lfloor \left( \frac{x_i}{C} * \lfloor 2^\beta - \lambda \rfloor \right) \right\rfloor \qquad \text{Formula 2}$$

$Z_i$ represents first data with an index i in N pieces of first data, $x_i$ represents an absolute value corresponding to original data with an index i in the N pieces of original data, C represents a compression factor used to compress the original data, $\lambda \geq 1$ and $i \in [0, N-1]$.

It should be noted that $\lfloor \ \rfloor$ may represent a floor function, or may represent rounding to the nearest integer, or the like. This is not specifically limited in this application. Under a requirement of the valid bit width $\beta$ a value range of $Z_i$ is $[0, 2^\beta-1]$. Therefore, a minimum value of $\lambda$ is 1, and a value greater than 1 is used, so that a precision requirement for subsequent calculation of the combined data can be reduced, especially operation complexity of compression and decompression on a fixed-point processor.

In an optional manner, the combined data satisfies Formula 3, and Formula 3 is as follows:

$$E_j = \sum_{q=0}^{\frac{N}{K}-1} \lfloor 2^{\beta * q} \rfloor * Z_{j*K+q} \qquad \text{Formula 3}$$

$E_j$ represents combined data with an index j in the combined data, $Z_{j*K+q}$ represents first data with an index $j*K+q$ in the N pieces of first data, and $j \in [0, K-1]$.

It should be noted that a plurality of pieces of first data are combined into combined data, and a bit width of the combined data is an integer, so that the combined data can be conveniently represented and transmitted on a physical circuit.

In an optional manner, $\beta$ is 5.4, 6.4, 6.5, 6.8, or 7.5.

According to a second aspect, this application provides a communication method. The method may be performed by an RRU or a BBU, or may be performed by a component (for example, a processor, a chip, or a chip system) of the RRU or the BBU, or may be performed by a logic module or software that can implement all or some functions of the RRU or the BBU. This is not specifically limited in this application.

The communication apparatus may obtain combined data; determine first data based on a data bit width $\beta$ corresponding to the first data and the combined data, where the first data is data obtained by compressing original data, and $\beta$ is a non-integer greater than 0; and determine N pieces of original data based on $\beta$ and the first data, where N is a positive integer.

In this application, a granularity of the data bit width may be accurate to a decimal. Compared with a case in which only an integer data bit width is supported, this type of data bit width better meets an actual application requirement of a device, and a high SNR can be ensured while a data transmission rate is ensured.

In an optional manner, $\beta$ satisfies Formula 1, and Formula 1 is as follows:

$$\beta = \frac{L * K}{N} + \sigma \qquad \text{Formula 1}$$

$$\sigma \in [-0.5, 0.5].$$

It should be noted that it can be learned from N/K that one piece of combined data is constructed by using several pieces of original data, and it can be learned from $$\frac{L * K}{N}$$

that a bit width corresponding to one piece of original data after compression and combination may be a non-cyclic or cyclic decimal, and $\beta$ and $\sigma$ may be summed to obtain a non-cyclic decimal. A granularity of the data bit width of $\beta$ determined in this manner may be accurate to a decimal.

Compared with a case in which only an integer data bit width is supported, this type of data bit width better meets an actual application requirement of a device, and a high SNR can be ensured while a data transmission rate is ensured.

In an optional manner, the first data satisfies Formula 4, and Formula 4 is as follows:

$$Z_{j*K+q} = \begin{cases} \left[\left(\left\lfloor\frac{E_j}{\lfloor 2^{\beta*q}\rfloor}\right\rfloor\right)\right], & q = \frac{N}{K} - 1 \\ \left[\left(\frac{E_j - \sum_{p=q+1}^{\frac{N}{K}-1} Z_{j*\beta+p}*\lfloor 2^{\beta*p}\rfloor}{\lfloor 2^{\beta*q}\rfloor}\right)\right], & 0 \le q \le \frac{N}{K} - 2 \end{cases} \qquad \text{Formula 4}$$

$Z_{j*K+q}$ represents first data with an index j*K+q in N pieces of first data, $j \in [0,K-1]$, and $E_j$ represents combined data with an index j in the combined data.

In an optional manner, the original data satisfies Formula 5, and Formula 5 is as follows:

$$x_i = \frac{Z_i * C}{\lfloor 2^\beta - \lambda \rfloor} \qquad \text{Formula 5}$$

$x_i$ represents an absolute value corresponding to original data with an index i in the N pieces of original data, C represents a compression factor used to compress the original data, $\lambda \ge 1$, and $i \in [0, N-1]$.

It should be noted that $\lfloor\ \rfloor$ may represent a floor function, or may represent rounding to the nearest integer, or the like. This is not specifically limited in this application.

According to a third aspect, this application provides a communication apparatus. The apparatus may be, for example, an RRU or a BBU, or may be a chip, a chip system, or a processor that supports the RRU or the BBU in implementing the foregoing method, or may be a logic module or software that can implement all or some functions of the RRU or the BBU. The apparatus includes a processing unit and an interface unit.

The processing unit is configured to obtain first data based on N pieces of original data, an amount K of combined data, and a data bit width L of the combined data, where the first data is data obtained by compressing the original data, a data bit width corresponding to the first data is β, β is a non-integer greater than 0, and N, K, and L are positive integers; and determine the combined data based on β and the first data. The interface unit is configured to output the combined data.

In an optional manner, the processing unit is further configured to:
  obtain second data based on the N pieces of original data, where the second data represents positive and negative features of each of the N pieces of original data. The interface unit is configured to output the combined data and the second data.
In an optional manner, β satisfies:

$$\beta = \frac{L * K}{N} + \sigma$$

$$\sigma \in [-0.5, 0.5].$$

In an optional manner, the first data satisfies:

$$Z_i = \left\lfloor\left(\frac{x_i}{C} * \lfloor 2^\beta - \lambda \rfloor\right)\right\rfloor$$

$Z_i$ represents first data with an index i in N pieces of first data, $x_i$ represents an absolute value corresponding to original data with an index i in the N pieces of original data, C represents a compression factor used to compress the original data, $\lambda \ge 1$, and $i \in [0, N-1]$.

In an optional manner, the combined data satisfies:

$$E_j = \sum_{q=0}^{\frac{N}{K}-1} \lfloor 2^{\beta*q} \rfloor * Z_{j*K+q}$$

$E_j$ represents combined data with an index j in the combined data, $Z_{j*K+q}$ represents first data with an index j*K+q in the N pieces of first data, and $j \in [0,K-1]$.

In an optional manner, β is 5.4, 6.4, 6.5, 6.8, or 7.5.

According to a fourth aspect, this application provides a communication apparatus. The apparatus may be, for example, an RRU or a BBU, or may be a chip, a chip system, or a processor that supports the RRU or the BBU in implementing the foregoing method, or may be a logic module or software that can implement all or some functions of the RRU or the BBU. The apparatus includes an interface unit and a processing unit.

The interface unit is configured to obtain combined data. The processing unit is configured to determine first data based on a data bit width β corresponding to the first data and the combined data, where the first data is data obtained by compressing original data, and β is a non-integer greater than 0; and determine N pieces of original data based on β and the first data, where N is a positive integer.

In an optional manner, β satisfies Formula 1, and Formula 1 is as follows:

$$\beta = \frac{L * K}{N} + \sigma \qquad \text{Formula 1}$$

$$\sigma \in [-0.5, 0.5].$$

In an optional manner, the first data satisfies Formula 4, and Formula 4 is as follows:

$$Z_{j*K+q} = \begin{cases} \left[\left(\left\lfloor\frac{E_j}{\lfloor 2^{\beta*q}\rfloor}\right\rfloor\right)\right], & q = \frac{N}{K} - 1 \\ \left[\left(\frac{E_j - \sum_{p=q+1}^{\frac{N}{K}-1} Z_{j*\beta+p}*\lfloor 2^{\beta*p}\rfloor}{\lfloor 2^{\beta*q}\rfloor}\right)\right], & 0 \le q \le \frac{N}{K} - 2 \end{cases} \qquad \text{Formula 4}$$

$Z_{j*K+q}$ represents first data with an index j*K+q in N pieces of first data, $j \in [0,K-1]$, and $E_j$ represents combined data with an index j in the combined data.

In an optional manner, the original data satisfies Formula 5, and Formula 5 is as follows:

$$x_i = \frac{Z_i * C}{\lfloor 2^\beta - \lambda \rfloor}$$

Formula 5

$x_i$ represents an absolute value corresponding to original data with an index i in the N pieces of original data, C represents a compression factor used to compress the original data, $\lambda \geq 1$, and $i \in [0, N-1]$.

According to a fifth aspect, this application provides a communication apparatus, including a processor. The processor is coupled to a memory, the memory is configured to store a program or instructions, and when the program or the instructions are executed by the processor, the apparatus is enabled to perform the method according to the first aspect or the embodiments of the first aspect or the method according to the second aspect or the embodiments of the second aspect.

According to a sixth aspect, this application provides another communication apparatus, including an interface circuit and a logic circuit. The interface circuit may be understood as an input/output interface, and the logic circuit may be configured to run code instructions to perform the method according to the first aspect or the embodiments of the first aspect or the method according to the second aspect or the embodiments of the second aspect.

According to a seventh aspect, this application further provides a computer-readable storage medium. The computer-readable storage medium stores computer-readable instructions, and when the computer-readable instructions are run a computer, the computer is enabled to perform the method according to the first aspect or any possible design of the first aspect or the method according to the second aspect or any possible design of the second aspect.

According to an eighth aspect, this application provides a computer program product including instructions. When a computer program or the instructions are run a computer, the computer is enabled to perform the method according to the first aspect or the embodiments of the first aspect or the method according to the second aspect or the embodiments of the second aspect.

According to a ninth aspect, this application provides a chip system. The chip system includes a processor, may further include a memory, and is configured to implement the method according to the first aspect or any possible design of the first aspect or the method according to the second aspect or any possible design of the second aspect. The chip system may include a chip, or may include a chip and another discrete device.

According to a tenth aspect, this application provides a communication system. The system may include a BBU and an RRU, and the communication system is configured to perform the method according to the first aspect or any possible design of the first aspect or the method according to the second aspect or any possible design of the second aspect.

For technical effects that can be achieved in the second aspect to the tenth aspect, refer to descriptions of technical effects that can be achieved in corresponding possible design solutions in the first aspect or the second aspect. Details are not described herein again in this application.

BRIEF DESCRIPTION OF DRAWINGS

FIG. 1 is a schematic diagram of a communication system according to an embodiment of this application;

FIG. 2 is a schematic flowchart of a communication method according to an embodiment of this application;

FIG. 4 is a schematic flowchart of a data decompression method according to an embodiment of this application;

FIG. 5 is a schematic diagram of a structure of a communication apparatus according to an embodiment of this application;

DESCRIPTION OF EMBODIMENTS

Figure 3:
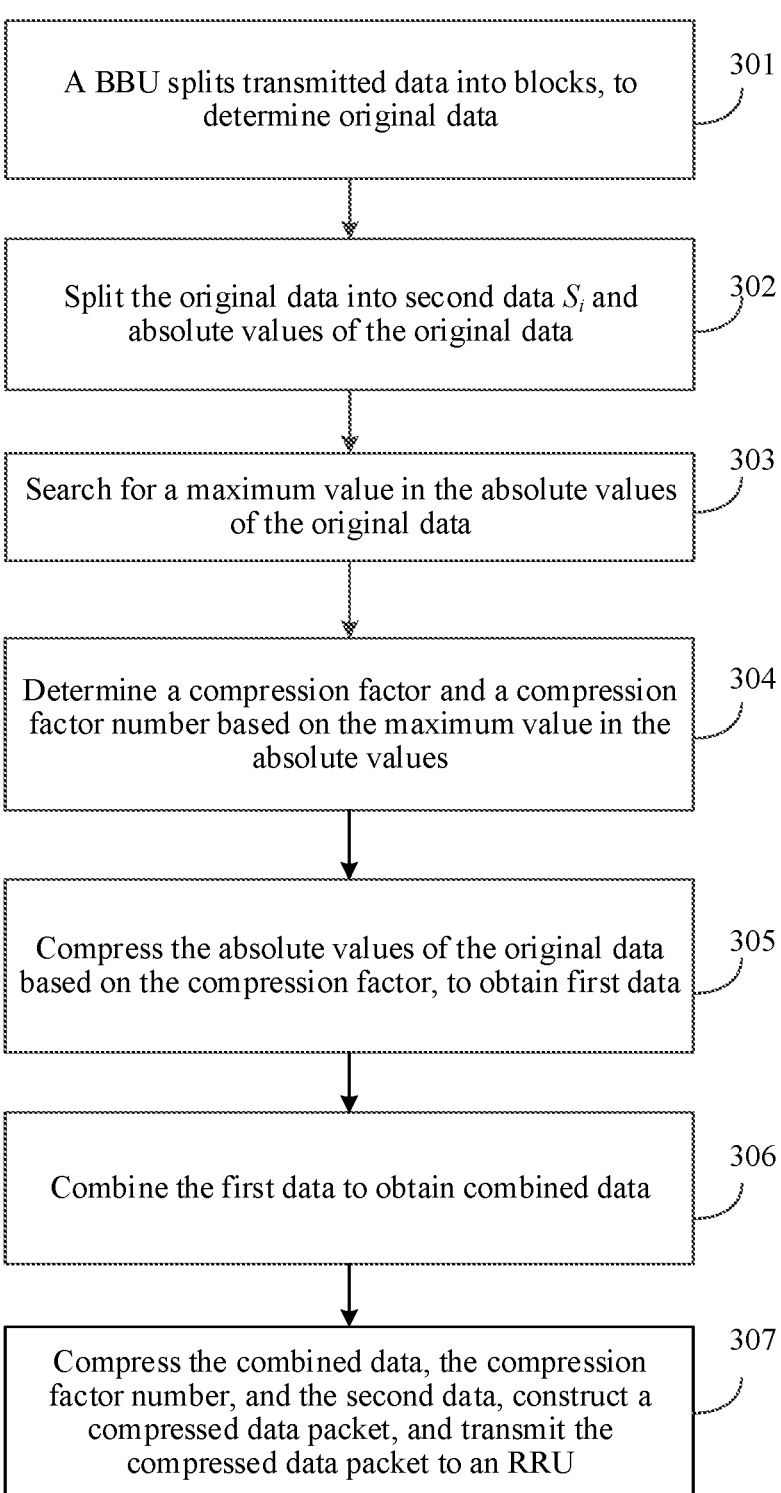
FIG. 3 is a schematic flowchart of a data compression method according to an embodiment of this application.

To make the objectives, technical solutions, and advantages of this application clearer, the following further describes this application in detail with reference to the accompanying drawings. A specific operation method in a method embodiment may also be applied to an apparatus embodiment or a system embodiment. In the descriptions of this application, unless otherwise specified, "a plurality of" means two or more than two. Therefore, for implementations of an apparatus and a method, reference may be made to each other, and no repeated description is provided.

FIG. 1 shows an example of a schematic diagram of an architecture of a communication system according to this application. The system may include at least one BBU and at least one RRU. FIG. 1 is described by using an example in which one BBU 101 and one RRU 102 are included. FIG. 1 is merely an example for description, and does not specifically limit the architecture of the communication system. The BBU 101 and the RRU 102 may exchange data through a communication interface. During downlink data transmission, the BBU may perform data compression, and transmit compressed data to the RRU through the communication interface, and the RRU decompresses on the compressed data. During uplink data transmission, the RRU may perform data compression, and transmit compressed data to the BBU through the communication interface, and the BBU decompresses the compressed data. The communication interface may be a CPRI, or may be another communication interface. This is not limited in this application.

During downlink data transmission, the RRU receives the compressed data from the BBU, performs decompression, up-sampling, digital-to-analog conversion, modulation, and power amplification, and finally transmits the data through an antenna. The BBU schedules an air interface resource for a user, performs channel coding and modulation on user data, performs data compression on modulated data, and transmits compressed data to the RRU. During uplink data transmission, the RRU performs amplification, modulation, down-sampling, and analog-to-digital conversion on an analog signal from the antenna to obtain a digital signal, then performs compression to obtain compressed data, and finally sends the compressed data to the BBU. The BBU receives the compressed data from the RRU and performs demodulation and decoding.

This application is also applicable to a communication system constructed by a BBU-like module and an RRU-like module. The RRU-like module has a function of conversion between a digital signal and an analog signal, may be used for analog signal modulation and amplification, and may further include one or more of functions such as waveform generation, sampling rate conversion, digital modulation, multi-user multiplexing, and receiving equalization of a digital signal. The BBU-like module has functions of detecting, encoding, and decoding a digital signal, and may further include one or more of functions such as waveform generation, sampling rate conversion, digital modulation, multi-user multiplexing, and receiving equalization of the digital signal. There is a communication interface between the BBU-like module and the RRU-like module, and compressed data may also be transmitted through the communication interface by using a method provided in this application. This is not specifically limited in this application. The BBU-like module may be implemented in a form of hardware and/or software, and the RRU-like module may be implemented in a form of hardware and/or software. This is not limited in this application.

It should be noted that, during actual application, the solution of this application may be further applied to data processing between a processor and a memory. A data processing procedure between the processor and the memory is the same as a data processing procedure between the BBU and the RRU. Details are not described herein in this application.

As described in the background, generally, the communication interface between the BBU and the RRU is for transmitting data by using a fixed integer data bit width, and a data rate change and a quantized SNR change that correspond to each bit are great. In an actual communication system, an available bandwidth of a communication interface may not correspond to an integer bit width, and still using the integer bit width may cause an SNR performance loss, or waste a data transmission rate. In view of this, this application provides a communication method, so that a granularity of a data bit width is finer and better meets a requirement of a device, and a high SNR can be ensured while a data transmission rate is ensured.

FIG. 2 shows a communication method according to an embodiment of this application. In FIG. 2, an example in which a BBU and an RRU are used as execution subjects for interaction is used to illustrate the method. However, the execution subjects for interaction are not limited in this application. For example, the BBU in FIG. 2 may alternatively be a chip, a chip system, or a processor that supports the BBU in implementing the method, or may be a logic module or software that can implement all or some functions of the BBU. The RRU in FIG. 2 may alternatively be a chip, a chip system, or a processor that supports the RRU in implementing the method, or may be a logic module or software that can implement all or some functions of the RRU.

Step 201: The BBU obtains first data based on N pieces of original data, an amount K of combined data, and a data bit width L of the combined data, where the first data is data obtained by compressing the original data, a data bit width corresponding to the first data is $\beta$, $\beta$ is a non-integer greater than 0, and N, K, and L are positive integers.

The foregoing original data may be understood as uncompressed data, data stored in a communication apparatus, data collected by a collection apparatus connected to the communication apparatus (where for example, if the communication apparatus is connected to a voltage sensor, and a voltage value collected by the voltage sensor is 36 V, 36 V may be understood as original data), or the like. This is not specifically limited in this application. For example, when data is transmitted between the BBU and the RRU, a large bandwidth is occupied for directly transmitting original data, and a large quantity of optical fiber devices are required to carry the original data, resulting in high costs. In this application, considering a cost issue, the original data may be compressed, and compressed data may be combined to construct combined data for transmission.

It should be noted that, during actual application, an amount of data to be transmitted by the BBU may be large, and the N pieces of original data may be obtained through sampling processing. For example, if sampling processing is performed, by using a same sampling frequency 1, on the data to be transmitted by the BBU, to obtain sampled data 1 to sampled data N, the sampled data 1 to sampled data N are used as the original data for data processing. Normalization processing may be further performed on the data to be transmitted by the BBU. For example, after the data is represented by using a binary value, sampling processing is performed by using a same sampling frequency, to obtain the original data. A manner of obtaining the original data is not specifically limited herein in this application.

In addition, it should be further noted that values of N and K may be agreed on in advance by the BBU and the RRU. Generally, N is a composite number, and K is a divisor of N. For example, N is 32, and K is 16 or 8, N is 30, and K is 15, 6, or 5. This is not specifically limited in this application.

Step 202: The BBU determines the combined data based on $\beta$ and the first data.

During application of this application, considering an actual application environment of the communication apparatus, for example, a supported bandwidth and a data transmission rate, the data bit width L of the combined data may be determined based on the actual application environment of the communication apparatus. The first data may be obtained by performing data processing (weighting, a data operation, and the like) based on the data bit width L, the amount K of combined data, and the N pieces of original data. The first data may be understood as data obtained by compressing the original data. After data processing, the original data is compressed, and the data bit width corresponding to the first data is $\beta$. $\beta$ may be understood as a data bit width corresponding to each piece of first data after a plurality of pieces of first data are combined, and a valid bit width in a data transmission process. A numerical range of the valid bit width is $[0, 2^{\beta}-1]$. For example, a valid bit width of 6.5 indicates that a numerical range of the valid bit width is $[0, 2^{6.5}-1]$, that is $[0, 89]$. For example, first data A and first data B are combined into data C, a data bit width corresponding to the data C is L, and a data bit width corresponding to the first data A may be understood as $\beta$. In addition, it should be further noted that $\beta$ may be data A obtained based on L, K, and N, or may be data obtained by processing the data A. This is not specifically limited in this application. For example, if the data A obtained based on L, K, and N is 6.5, $\beta$ may be 6.5, 6.4, or 6.3, or if the data A obtained based on L, K, and N is ⅓, may be 0.3, 0.33, or the like. In addition, $\beta$ may alternatively be 5.4, 6.4, 6.5, 6.8, or 7.5. This is not specifically limited in this application.

Step 203: The BBU outputs the combined data to the RRU. Correspondingly, the RRU may obtain the combined data.

Step 204: The RRU determines the first data based on the data bit width $\beta$ corresponding to the first data and the combined data, where the first data is data obtained by compressing the original data, and $\beta$ is a non-integer greater than 0.

Step 205: The RRU determines the N pieces of original data based on $\beta$ and the first data, where N is a positive integer.

In this application, a granularity of the data bit width may be accurate to a decimal. Compared with a case in which only an integer data bit width is supported, this type of data bit width better meets an actual application requirement of a device, and a high SNR can be ensured while a data transmission rate is ensured.

In an optional manner, the BBU may obtain second data based on the N pieces of original data, where the second data represents positive and negative features of each of the N pieces of original data; and the BBU may output the combined data and second data.

It should be noted that the original data has positive and negative values. For example, the original data is a voltage value, and the voltage value may be a negative value or a positive value. If the positive and negative values of the original data are not separated, an error may occur in calculation of the combined data, and accuracy of the obtained data is reduced. During data transmission, plus and minus symbols of the original data and numerical values of the data are separated and calculated, so that the combined data that can be obtained is all positive numbers. In addition, during decompression, the combined data may be quickly decompressed, to avoid a calculation error caused by a data symbol participating in calculation. When calculation efficiency is improved, data processing efficiency can be improved.

The second data may be determined by using Formula 0:

$$S_i = \begin{cases} 0, \text{ if } D_i \geq 0 \\ 1, \text{ if } D_i < 0 \end{cases} \qquad \text{Formula 0}$$

$S_i$ represents second data with an index i in N pieces of second data, $D_i$ represents original data with an index i in the N pieces of original data, and $i \in [0, N-1]$.

For example, if there are five pieces of original data, which are −25, 69, −52, 87, and 123, original data with an index 0 is −25, and original data with an index 4 is 123, since −25 is less than 0, second data with an index 0 is 1, and since 123 is greater than 0, second data with an index 4 is 0. Certainly, during actual application, when the original data is less than 0, the second data may also be 0. When the original data is greater than or equal to 0, the second data may also be 1, or may be another value such as 2 or 3. This is not specifically limited in this application and may be flexibly designed based on actual application. However, a design rule of the BBU needs to be informed to the RRU in advance, so that the RRU can correctly parse the original data. In addition, i mentioned above is merely an index number, and a value range of i may alternatively be 1 to N, 2 to N+1, or the like. This is not specifically limited in this application. Formula 0 is merely an example for description, and does not specifically limit a value range of i. The value range of i may be flexibly designed based on actual application. For descriptions of i in the following, refer to this part, and details are not described in the following. However, a design rule of the BBU needs to be informed to the RRU in advance, so that the RRU can correctly parse the original data.

In addition, it should be further noted that, after data processing shown in the foregoing Formula 0 is performed on the original data, the second data and an absolute value corresponding to the original data may be obtained. The absolute value is represented by $x_i$ herein or another letter.

This is not specifically limited in this application. The foregoing example is still used. If the original data with the index 0 is −25, $x_0$ is 25.

During actual application, the BBU may determine a maximum value $x_{max}$ in $x_0$ to $x_{N-1}$, search Table 2 of compression factor indexes based on $x_{max}$, find a minimum compression factor greater than $x_{max}$ in the Table 2, and determine a number corresponding to the compression factor. For example, $x_{max}$=4500, in Table 2, the minimum compression factor greater than $x_{max}$ is 8192, and an index number corresponding to 8192 is 1101.

TABLE 2

| Number | 0000 | 0001 | 0010 | ... | 1100 | 1101 | 1110 | 1111 |
|---|---|---|---|---|---|---|---|---|
| Compression factor C | 2 | 4 | 8 | ... | 4096 | 8192 | 16384 | 32768 |

It should be noted that, using a compression factor greater than $x_{max}$ can ensure that $x_0$ to $x_{N-1}$ can all be compressed to smaller values during compression, and can ensure that data of $x_0$ to $x_{N-1}$ is fully compressed. Selecting the minimum compression factor greater than $x_{max}$ instead of randomly selecting a compression factor can ensure compression precision. If a value of the compression factor is excessively small, a compression granularity is insufficient, and a bandwidth required for transmission is larger. If a value of the compression factor is excessively large, a compression granularity is excessively large, and precision of transmitted data is reduced (where for example, if compression is performed by using the compression factor 32768, for the original data, only two high-order bits of data may be reserved). Therefore, the minimum compression factor greater than $x_{max}$ is selected to compress the data.

In addition, in this application, a data bit width of a finer granularity is considered, and when the compression factor is obtained, β needs to be further determined, to perform more accurate compression on $x_i$.

In an optional manner, β satisfies Formula 1, and Formula 1 is as follows:

$$\beta = \frac{L * K}{N} + \sigma \qquad \text{Formula 1}$$

$$\sigma \in [-0.5, 0.5].$$

It should be noted that, it can be learned from N/K that one piece of combined data is constructed by using several pieces of original data, and it can be learned from $$\frac{L * K}{N}$$

that a bit width corresponding to one piece of original data after compression and combination may be a non-cyclic or cyclic decimal, and β and σ a may be summed to obtain a non-cyclic decimal. A granularity of the data bit width of β determined in this manner may be accurate to a decimal. Compared with a case in which only an integer data bit width is supported, this type of data bit width better meets an actual application requirement of a device, and a high SNR can be ensured while a data transmission rate is ensured.

After a calculation method of $\beta$ is determined, by using Formula 2, it may be determined that the first data, that is, data that needs to be compressed, satisfies Formula 2, and Formula 2 is as follows:

$$Z_i = \left\lfloor \left( \frac{x_i}{C} * \lfloor 2^\beta - \lambda \rfloor \right) \right\rfloor \qquad \text{Formula 2}$$

$Z_i$ represents first data with an index i in N pieces of first data, $x_i$ represents an absolute value corresponding to original data with an index i in the N pieces of original data, C represents a compression factor used to compress the original data, $\lambda \geq 1$, and $i \in [0, N-1]$.

It should be noted that $\lfloor \ \rfloor$ may represent a floor function, or may represent rounding to the nearest integer, or the like. This is not specifically limited in this application. A same symbol is used in the following, and a meaning of the symbol is the same as that described herein. Details are not described again in the following. For example, if $\beta$ is 6.5 and $\lambda$ is 1, $$Z_i = \left\lfloor \left( \frac{x_i}{C} * \lfloor 2^{6.5} - 1 \rfloor \right) \right\rfloor.$$

After determining the first data, the BBU may combine the first data by using Formula 3:

$$E_j = \sum_{q=0}^{\frac{N}{K}-1} \lfloor 2^{\beta*q} \rfloor * Z_{j*K+q} \qquad \text{Formula 3}$$

$E_j$ represents combined data with an index j in the combined data, $Z_{j*K+q}$ represents first data with an index j*K+q in the N pieces of first data, and $j \in [0, K-1]$. A value range of j may be 0 to K−1, or may be 1 to K. This is not specifically limited in this application, and the value range of j may be flexibly designed based on actual application. A value range of q may be 0 to $$\frac{N}{K} - 1,$$

or may be 1 to N/K. This is not specifically limited in this application. If the value range of i starts from 0, the value ranges of j and q may also start from 0, to facilitate better calculation. If the value range of i starts from 1, the value ranges of j and q may also start from 1, to facilitate better calculation. For example, the value range of i is 1 to 32, the value range of j may be 1 to 16, and the value range of q may be 1 to 2. For example, if $\beta$ is 6.5 and $\lambda$ is 1, $$E_j = \sum_{q=0}^{1} \lfloor 2^{6.5*q} \rfloor * Z_{j*16+q}.$$

After determining the combined data, the BBU may pack the combined data, the second data, and the compression factor number into a compressed package, and transmit the compressed package to the RRU through a CPRI. The RRU may decompress the compressed package to obtain the combined data, the second data, and the compression factor number. For example, after the RRU decompresses the compressed package, a length of obtained data is 246 bits, and the data may be split into a 6-bit compression factor number, 32 sign bits occupying 32 bits, and 16 pieces of combined data of a length of 13 bits. In addition, the BBU may directly inform the RRU of a value of $\beta$ or agree on a preset algorithm with the RRU, for example, calculate the value of $\beta$ by using Formula 0. This is not specifically limited in this application.

The RRU may split the combined data into the first data by using Formula 4:

$$Z_{j*K+q} = \begin{cases} \left\lfloor \left( \frac{E_j}{\lfloor 2^{\beta*q} \rfloor} \right) \right\rfloor, & q = \frac{N}{K} - 1 \\ \left\lfloor \left( \frac{E_j - \sum_{p=q+1}^{\frac{N}{K}-1} Z_{j*\beta+p} * \lfloor 2^{\beta*p} \rfloor}{\lfloor 2^{\beta*q} \rfloor} \right) \right\rfloor, & 0 \leq q \leq \frac{N}{K} - 2 \end{cases} \qquad \text{Formula 4}$$

$Z_{j*K+q}$ represents first data with an index j*K+q in the N pieces of first data, $j \in [0, K-1]$, and $E_j$ represents combined data with an index j in the combined data. For example, each of the 16 pieces of combined data is split into two pieces of first data, and there are a total of 32 pieces of first data, where) $\beta = 6.5$.

$$\begin{cases} Z_{j*K+q} = \left\lfloor \left( \frac{E_j}{\lfloor 2^{6.5} \rfloor} \right) \right\rfloor \\ Z_{j*K} = \lfloor (E_j = Z_{j*K+1} * \lfloor 2^{6.5} \rfloor) \rfloor \end{cases} , j = 0 \text{ to } 15.$$

After determining the first data, the RRU may search Table 2 for the compression factor based on the compression factor number, and restore the absolute value corresponding to the original data by referring to Formula 5. Formula 5 is as follows:

$$x_i = \frac{Z_i * C}{\lfloor 2^\beta - \lambda \rfloor} \qquad \text{Formula 5}$$

$x_i$ represents an absolute value corresponding to original data with an index i in the N pieces of original data, and C represents a compression factor used to compress the original data.

The RRU determines the absolute value corresponding to the original data, and may add a sign bit to each piece of absolute value data based on the second data, to restore the original data. Details are shown in Formula 6:

$$D_i = x_i * (-1)^{S_i} \qquad \text{Formula 6}$$

Certainly, during actual application, if a BBU end separates the original data into the second data and the absolute value corresponding to the original data, when the original data is less than 0, the second data is 0; when the original data is greater than or equal to 0, the second data is 1, and Formula 6 may be adjusted to $D_i = x_i * (-1)^{1+S_i}$ The following describes the communication method in this application with reference to a specific example, and possible parameters are shown in Table 3.

TABLE 3

| Sign bit | Physical meaning |
|---|---|
| $[D_0; D_1; \ldots; D_{N-1}]$ | Original data |
| N | Amount of original data |
| $[s_0; s_1; \ldots; s_{N-1}]$ | Second data |
| $[z_0; z_1; \ldots; z_{N-1}]$ | First data |
| $[E_0; E_1; \ldots; E_{K-1}]$ | Combined data |
| K | Amount of combined data |
| $[C_0; C_1; \ldots; C_{(2^T-1)}]$ | Compression factors in ascending order, $C_j < C_{j+1}$, $0 \le j \le (2^T - 2)$ |
| t | Number corresponding to an optimal compression factor |
| T | Bit width of a compression factor number |
| L | Data bit width of the combined data |
| $\alpha$ | Amount of data included in each piece of combined data |
| $\beta$ | Data bit width corresponding to the first data |

During actual application, data transmitted by the BBU may be split into blocks, each block may include N pieces of original data, and the original data may be obtained by performing sampling and normalization processing on the transmitted data. During actual application, parameters shown in Table 4 below may be selected based on a transmission bandwidth allowed by a device. Table 4 is merely an example for description. During actual application, a block size may alternatively be another value, for example, 30 or 56. This is not specifically limited in this application. A bit width of combined data is related to the transmission bandwidth of the device and this is not limited herein. Only 13 bits are used as an example for description, and the bit width may be flexibly adjusted based on an actual requirement, for example, 33 bits or 65 bits. This is not specifically limited in this application. Data rate=Sampling rate*Antenna quantity*2*Average bit width.

TABLE 4

| Sampling rate (MHz) | Antenna quantity | Block size (N) | Bit width of a compression factor number (T) | Bit width of combined data (L) | Amount of combined data in a block (K) | Average bit width (KL + T)/N + 1 | Data rate (Mbps) |
|---|---|---|---|---|---|---|---|
| 30.72 | 4 | 32 | 6 | 13 | 16 | 7.6875 | 1889.28 |

During data compression, the BBU may perform the following steps with reference to steps shown in FIG. 3.

Step 301: The BBU splits transmitted data into blocks, to determine original data, for example, splits the transmitted data into a plurality of data blocks, where each data block includes 32 pieces of original data: $[D_0; D_1; \ldots; D_{31}]$.

Step 302: Split the original data into second data $S_i$ and absolute values $x_i$ of the original data, where the original data may be split by using Formula 0.

Step 303: Search for a maximum value $x_{max}$ in the absolute values of the original data.

Step 304: Determine a compression factor and a compression factor number based on the maximum value in the absolute values, where t is a selected compression factor number.

$$t = \begin{cases} 0, \text{ if } x_{max} \le C_0 \\ i, \text{ if } C_{i-1} < x_{max} \le C_i, i = 1 \text{ to } N-1 \end{cases}$$

It can be learned from Table 2 that if $x_{max}$ is 4500, where 4096 ($C_{1100}$)<4500≤8192 ($C_{1101}$), it can be learned that the compression factor number is 1101.

Step 305: Compress the absolute values of the original data based on the compression factor, to obtain first data, where $\alpha$=N/K, $\beta$=L/$\alpha$, and calculation may be performed by using Formula 2; when the parameters are the data in Table 4, $\alpha$=2, $\beta$=6.5, and $$z_i = \text{floor}\left(\frac{x_i}{C_t} * \text{floor}(2^{6.5} - 1)\right);$$

and if L is 33, N is 30, and K is 5, $\alpha$=5, $\beta$=6.6, and $$z_i = \text{floor}\left(\frac{x_i}{C_t} * \text{floor}(2^{6.6} - 1)\right).$$

Step 306: Combine the first data to obtain combined data, where the combined data may be determined by using Formula 3; if the data in Table 4 is used, $$E_j = \sum_{q=0}^{1} z_{j*15+q} * \text{floor}(2^{6.5*q}),$$

where j=0 to 15; and if L is 33, N is 30, and K is 5, $\alpha$=5, $\beta$=6.6, and $$E_j = \sum_{q=0}^{4} z_{j*6+q} * \text{floor}(2^{66*q}),$$

where j=0 to 5.

Step 307: Compress the combined data, the compression factor number, and the second data, construct a compressed data packet, and transmit the compressed data packet to the RRU, where the data packet may be shown in Table 5 below.

TABLE 5

| Compression factor number | Second data | Combined data |
|---|---|---|
| t | $[s_0; s_1; \ldots; s_{N-1}]$ | $[E_0; E_1; \ldots; E_{K-1}]$ |

Correspondingly, during decompression, the RRU may perform the following steps with reference to FIG. 4.

Step 401: The RRU decompresses a data packet to obtain combined data, second data, and a compression factor number; and splits received data into blocks, where a length of each block is (T+N+KL) bits, and each block is split into a compression factor index t (T bits), sign bits $[s_0; s_1; \ldots; s_{N-1}]$, and combined data $[E_0; E_1; \ldots; E_{K-1}]$; if the parameters in Table 4 are used, a length of each block may be 246 bits, and the block is split into one 6-bit compression factor code, 32 sign bits, and 16 pieces of combined data of a length of 13 bits; and if L is 33, N is 30, and K is 5, a length of each block may be 234 bits, and the block is split into one 6-bit compression factor code, 30 sign bits, and six pieces of combined data of a length of 33 bits.

Step 402: The RRU splits the combined data into first data, where the combined data may be split by using Formula 4. For example, each of the 16 pieces of combined data is split into two pieces of first data, and a total of 32 pieces of first data are obtained, where β=6.5.

$$\begin{cases} z_{j*K+1} = \text{floor}\left(\dfrac{E_j}{\text{floor}(2^{6.5})}\right) \\ z_{j*K} = \text{floor}\left(E_j - z_{j*K+1} * \text{floor}(2^{6.5})\right) \end{cases} , j = 0 \text{ to } 15$$

If each of the six pieces of combined data is split into five pieces of first data, a total of 30 pieces of first data are obtained, where β=6.6.

$$\begin{cases} z_{j*6+4} = \text{floor}\left(\dfrac{E_j}{\text{floor}\left(2^{6.6*4}\right)}\right) \\ z_{j*6+q} = \text{floor}\left(\dfrac{E_j - \sum_{p=q+1}^{4} z_{j*6+p} * \text{floor}(2^{6.6*p})}{\text{floor}\left(2^{6.6*q}\right)}\right) , q = 3 \text{ to } 0 \end{cases}$$
$$j = 0 \text{ to } 5$$

Step 403: Search for a compression factor based on the compression factor number, and restore, based on the compression factor, the first data to an absolute value corresponding to the original data, where calculation may be performed by using Formula 5. For example $$x_i = \frac{z_i * C_t}{\text{floor}(2^{6.5} - 1)}, i = 0 \text{ to } 31.$$

Step 404: The RRU restores the original data based on the second data and the absolute value corresponding to the original data, where calculation may be performed by using Formula 6. Details are not described in this application.

In this application, a granularity of a data bit width may be accurate to a decimal. Compared with a case in which only an integer data bit width is supported, this type of data bit width better meets an actual application requirement of a device, and a high SNR can be ensured while a data transmission rate is ensured.

FIG. 5 shows a communication apparatus according to this application. The communication apparatus may be understood as the foregoing RRU or the foregoing BBU. This is not specifically limited in this application. The communication apparatus includes a processing unit 501 and an interface unit 502. It should be understood that the interface unit may be referred to as a transceiver unit, a communication unit, or the like, and the processing unit may be a processor. When the communication apparatus is a module (for example, a chip), an input/output unit may be an input/output interface, an input/output circuit, an input/output pin, or the like, or may be referred to as an interface, a communication interface, an interface circuit, or the like. The processing unit may be a processor, a processing circuit, a logic circuit, or the like. The communication apparatus may be configured to perform the steps in the method embodiment corresponding to FIG. 2. For specific descriptions of implementation details, refer to the method embodiment. Details are not described herein again.

The processing unit 501 is configured to obtain first data based on N pieces of original data, an amount K of combined data, and a data bit width L of the combined data, where the first data is data obtained by compressing the original data, a data bit width corresponding to the first data is β, β is a non-integer greater than 0, and N, K, and L are positive integers; and determine the combined data based on β and the first data. The interface unit 502 is configured to output the combined data.

It should be noted that the foregoing original data may be understood as uncompressed data, data stored in a communication apparatus, data collected by a collection apparatus connected to the communication apparatus (where for example, if the communication apparatus is connected to a voltage sensor, and a voltage value collected by the voltage sensor is 36 V, 36 V may be understood as original data), or the like. This is not specifically limited in this application. For example, when data is transmitted between the BBU and the RRU, a large bandwidth is occupied for directly transmitting original data, and a large quantity of optical fiber devices are required to carry the original data, resulting in high costs. In this application, considering a cost issue, the original data may be compressed, and compressed data may be combined to construct combined data for transmission.

During application of this application, considering an actual application environment of the communication apparatus, for example, a supported bandwidth and a data transmission rate, the data bit width L of the combined data may be determined based on the actual application environment of the communication apparatus. The first data may be obtained by performing data processing (weighting, a data operation, and the like) based on the data bit width L, the amount K of combined data, and the N pieces of original data. The first data may be understood as data obtained by compressing the original data. After data processing, the original data is compressed, and the data bit width corresponding to the first data is β. β may be understood as a data bit width corresponding to each piece of first data after a plurality of pieces of first data are combined. For example, first data A and first data B are combined into data C, a data bit width corresponding to the data C is L, and a data bit width corresponding to the first data A may be understood as β. In addition, it should be further noted that β may be data A obtained based on L, K, and N, or may be data obtained by processing the data A. This is not specifically limited in this application. For example, if the data A obtained based on L, K, and N is 6.5, β may be 6.5, 6.4, or 6.3, or if the data A obtained based on L, K, and N is ⅓, β may be 0.3, 0.33, or the like. This is not specifically limited in this application.

In this application, a granularity of the data bit width may be accurate to a decimal. Compared with a case in which only an integer data bit width is supported, this type of data bit width better meets an actual application requirement of a device, and a high SNR can be ensured while a data transmission rate is ensured.

In an optional manner, the processing unit 501 is further configured to:

obtain second data based on the N pieces of original data, where the second data represents positive and negative features of each of the N pieces of original data. The interface unit 502 is configured to output the combined data and the second data.

It should be noted that the original data has positive and negative values. During data transmission, plus and minus symbols of the original data and numerical values of the data are separated and calculated, so that the combined data that can be obtained is all positive numbers. In addition, during decompression, the combined data may be quickly decompressed, to avoid a calculation error caused by a data symbol participating in calculation. When calculation efficiency is improved, data processing efficiency can be improved.

In an optional manner, $\beta$ satisfies:

$$\beta = \frac{L * K}{N} + \sigma$$

$$\sigma \in [-0.5, 0.5].$$

It should be noted that it can be learned from N/K that one piece of combined data is constructed by using several pieces of original data, and it can be learned from $$\frac{L * K}{N}$$

that a bit width corresponding to one piece of original data after compression and combination may be a non-cyclic or cyclic decimal, and $\beta$ and $\sigma$ may be summed to obtain a non-cyclic decimal. A granularity of the data bit width of $\beta$ determined in this manner may be accurate to a decimal. Compared with a case in which only an integer data bit width is supported, this type of data bit width better meets an actual application requirement of a device, and a high SNR can be ensured while a data transmission rate is ensured.

In an optional manner, the first data satisfies:

$$Z_i = \left\lfloor \left( \frac{x_i}{C} * \lfloor 2^\beta - \lambda \rfloor \right) \right\rfloor$$

$Z_i$ represents first data with an index i in N pieces of first data, $x_i$ represents an absolute value corresponding to original data with an index i in the N pieces of original data, C represents a compression factor used to compress the original data, $\lambda \geq 1$, and $i \in [0, N-1]$.

In an optional manner, the combined data satisfies:

$$E_j = \sum_{q=0}^{\frac{N}{K}-1} \lfloor 2^{\beta * q} \rfloor * Z_{j*K+q}$$

$E_j$ represents combined data with an index j in the combined data, $Z_{j*K+q}$ represents first data with an index j*K+q in the N pieces of first data, and $j \in [0, K-1]$.

In an optional manner, $\beta$ is 5.4, 6.4, 6.5, 6.8, or 7.5.

This application provides another communication apparatus. The interface unit 502 is configured to obtain combined data. The processing unit 501 is configured to determine the first data based on a data bit width $\beta$ corresponding to the first data and the combined data, where the first data is data obtained by compressing original data, and $\beta$ is a non-integer greater than 0; and determine N pieces of original data based on $\beta$ and the first data, where N is a positive integer.

It should be noted that the foregoing original data may be understood as uncompressed data, data stored in a communication apparatus, data collected by a collection apparatus connected to the communication apparatus (where for example, if the communication apparatus is connected to a voltage sensor, and a voltage value collected by the voltage sensor is 36 V, 36 V may be understood as original data), or the like. This is not specifically limited in this application. For example, when data is transmitted between the BBU and the RRU, a large bandwidth is occupied for directly transmitting original data, and a large quantity of optical fiber devices are required to carry the original data, resulting in high costs. In this application, considering a cost issue, the original data may be compressed, and the compressed data may be combined to construct combined data for transmission.

During application of this application, considering an actual application environment of the communication apparatus, for example, a supported bandwidth and a data transmission rate, the data bit width L of the combined data may be determined based on the actual application environment of the communication apparatus. The first data may be obtained by performing data processing (weighting, a data operation, and the like) based on the data bit width L, the amount K of combined data, and the N pieces of original data. The first data may be understood as data obtained by compressing the original data. After data processing, the original data is compressed, and the data bit width corresponding to the first data is $\beta$. $\beta$ may be understood as a data bit width corresponding to each piece of first data after a plurality of pieces of first data are combined. For example, first data A and first data B are combined into data C, a data bit width corresponding to the data C is L, and a data bit width corresponding to the first data A may be understood as $\beta$. In addition, it should be further noted that $\beta$ may be data A obtained based on L, K, and N, or may be data obtained by processing the data A. This is not specifically limited in this application. For example, if the data A obtained based on L, K, and N is 6.5, $\beta$ may be 6.5, 6.4, or 6.3, or if the data A obtained based on L, K, and N is 1/3, $\beta$ may be 0.3, 0.33, or the like. This is not specifically limited in this application.

In this application, a granularity of the data bit width may be accurate to a decimal. Compared with a case in which only an integer data bit width is supported, this type of data bit width better meets an actual application requirement of a device, and a high SNR can be ensured while a data transmission rate is ensured.

In an optional manner, $\beta$ satisfies Formula 1, and Formula 1 is as follows:

$$\beta = \frac{L * K}{N} + \sigma \qquad \text{Formula 1}$$

$$\sigma \in [-0.5, 0.5].$$

It should be noted that it can be learned from N/K that one piece of combined data is constructed by using several pieces of original data, and it can be learned from $$\frac{L * K}{N}$$

that a bit width corresponding to one piece of original data after compression and combination may be a non-cyclic or cyclic decimal, and $\beta$ and $\sigma$ may be summed to obtain a non-cyclic decimal. A granularity of the data bit width of $\beta$ determined in this manner may be accurate to a decimal. Compared with a case in which only an integer data bit width is supported, this type of data bit width better meets an actual application requirement of a device, and a high SNR can be ensured while a data transmission rate is ensured.

In an optional manner, the first data satisfies Formula 4, and Formula 4 is as follows:

$$Z_{j*K+q} = \begin{cases} \left[ \left( \frac{E_j}{\lfloor 2^{\beta*q} \rfloor} \right) \right], q = \frac{N}{K} - 1 & \text{Formula 4} \\ \left[ \left( \frac{E_j - \sum\limits_{p=q+1}^{\frac{N}{K}-1} Z_{j*\beta+p} * \lfloor 2^{\beta*p} \rfloor}{\lfloor 2^{\beta*p} \rfloor} \right) \right], 0 \leq q \leq \frac{N}{K} - 2 \end{cases}$$

$Z_{j*K+q}$ represents first data with an index $j*K+q$ in N pieces of first data, $j \in [0,K-1]$, and $E_j$ represents combined data with an index $j$ in the combined data.

In an optional manner, the original data satisfies Formula 5, and Formula 5 is as follows:

$$x_i = \frac{Z_i * C}{\lfloor 2^{\beta} - \lambda \rfloor} \qquad \text{Formula 5}$$

$x_i$ represents an absolute value corresponding to original data with an index i in the N pieces of original data, C represents a compression factor used to compress the original data, $\lambda \geq 1$, and $i \in [0,N-1]$.

Figure 6:
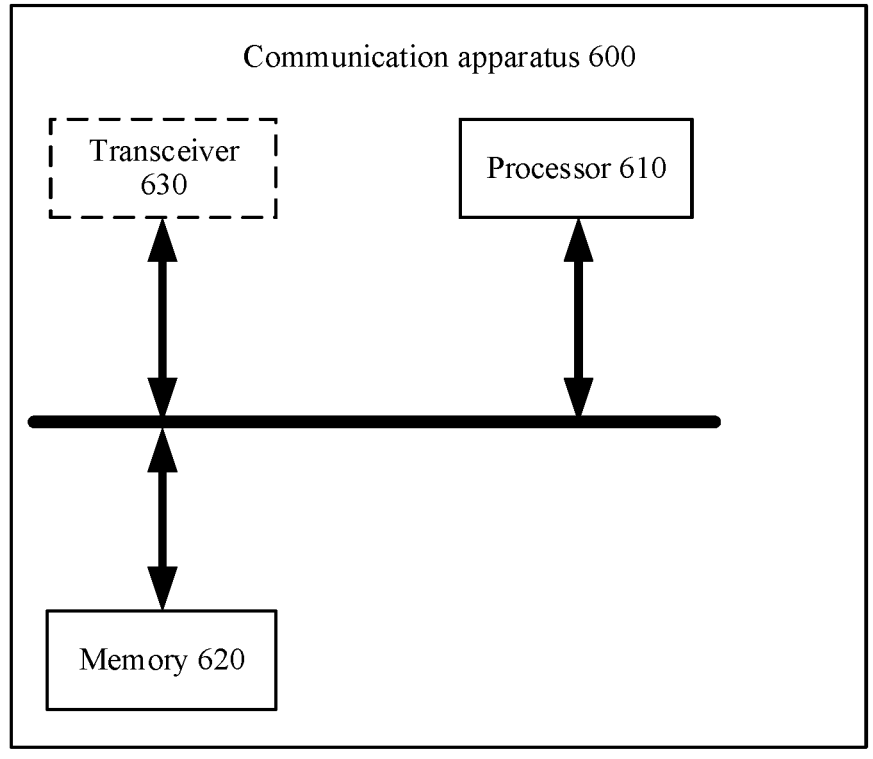
FIG. 6 is a schematic diagram of a structure of another communication apparatus according to an embodiment of this application.

In addition, FIG. 6 shows a communication apparatus 600 further provided in this application. For example, the communication apparatus 600 may be a chip or a chip system. Optionally, in embodiments of this application, the chip system may include a chip, or may include a chip and another discrete device.

The communication apparatus 600 may include at least one processor 610, and the communication apparatus 600 may further include at least one memory 620, configured to store a computer program, program instructions, and/or data. The memory 620 is coupled to the processor 610. The coupling in embodiments of this application may be an indirect coupling or a communication connection between apparatuses, units, or modules in an electrical form, a mechanical form, or another form, and is used for information exchange between the apparatuses, the units, or the modules. The processor 610 may perform an operation in cooperation with the memory 620. The processor 610 may execute the computer program stored in the memory 620. Optionally, the at least one memory 620 may alternatively be integrated with the processor 610.

Optionally, during actual application, the communication apparatus 600 may include a transceiver 630 or may not include a transceiver 630. A dashed box is used as an example in the figure. The communication apparatus 600 may exchange information with another device by using the transceiver 630. The transceiver 630 may be a circuit, a bus, a transceiver, or any other apparatus that can be configured to perform information exchange.

In a possible implementation, the communication apparatus 600 may be used in the foregoing terminal device, or may be the foregoing BBU, or may be the foregoing RRU. The memory 620 stores a necessary computer program, program instructions, and/or data for implementing a function of the BBU or the RRU in any one of the foregoing embodiments. The processor 610 may execute the computer program stored in the memory 620, to complete the method in any one of the foregoing embodiments.

A specific connection medium between the transceiver 630, the processor 610, and the memory 620 is not limited in embodiments of this application. In embodiments of this application, the memory 620, the processor 610, and the transceiver 630 are connected by using a bus in FIG. 6. The bus is represented by a thick line in FIG. 6. A manner of connection between other components is merely an example for description, and is not limited. The bus may be classified into an address bus, a data bus, a control bus, or the like. For ease of representation, only one thick line is used for representation in FIG. 6, but this does not mean that there is only one bus or only one type of bus. In embodiments of this application, the processor may be a general-purpose processor, a digital signal processor, an application-specific integrated circuit, a field programmable gate array or another programmable logic device, a discrete gate or a transistor logic device, or a discrete hardware component, and may implement or perform the methods, steps, and logical block diagrams disclosed in embodiments of this application. The general-purpose processor may be a microprocessor or any conventional processor, or the like. The steps with reference to the method disclosed in embodiments of this application may be directly performed by a hardware processor, or may be performed by a combination of hardware and a software module in the processor.

In embodiments of this application, the memory may be a non-volatile memory, for example, a hard disk (hard disk drive, HDD), a solid-state drive (solid-state drive, SSD), or the like, or may be a volatile memory (volatile memory), for example, a random access memory (random-access memory, RAM). The memory may alternatively be any other medium that can be configured to carry or store expected program code in an instruction form or a data structure form and that can be accessed by a computer. This is not limited. The memory in embodiments of this application may alternatively be a circuit or any other apparatus that can implement a storage function, and is configured to store the computer program, the program instructions, and/or the data.

Figure 7:
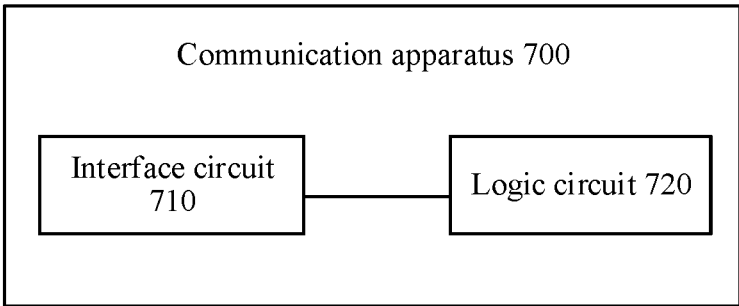
FIG. 7 is a schematic diagram of a structure of another communication apparatus according to an embodiment of this application.

Based on the foregoing embodiments, as shown in FIG. 7, an embodiment of this application further provides another communication apparatus 700, including an interface circuit 710 and a logic circuit 720. The interface circuit 710 may be understood as an input/output interface, and may be configured to perform operation steps the same as those of the input/output unit shown in FIG. 5 or the transceiver shown in FIG. 6. Details are not described herein again in this application. The logic circuit 720 may be configured to run code instructions to perform the method in any one of the foregoing embodiments. The logic circuit 720 may be understood as the processing unit in FIG. 5 or the processor in FIG. 6, and may implement a same function as the processing unit or the processor. Details are not described herein again in this application.

Based on the foregoing embodiments, an embodiment of this application further provides a readable storage medium. The readable storage medium stores instructions, and when the instructions are executed, the communication method in any one of the foregoing embodiments is implemented. The readable storage medium may include any medium that can store a program code, such as a USB flash drive, a removable hard disk, a read-only memory, a random access memory, a magnetic disk, or an optical disc.

A person skilled in the art should understand that embodiments of this application may be provided as methods, systems, or computer program products. Therefore, this application may use a form of complete hardware embodiments, complete software embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flow-charts and/or the block diagrams of the method, the appa-ratus (system), and the computer program product according to this application. It should be understood that computer program instructions may be used to implement each pro-cess and/or each block in the flowcharts and/or the block diagrams and a combination of processes and/or blocks in the flowcharts and/or the block diagrams. These computer program instructions may be provided to a general-purpose computer, a dedicated computer, an embedded processor, or a processor of another programmable data processing appa-ratus to generate a machine, so that the instructions executed by the computer or the processor of the another program-mable data processing apparatus generate an apparatus for implementing a function specified in one or more processes in the flowcharts and/or in one or more blocks in the block diagrams.

These computer program instructions may be alterna-tively stored in a computer-readable memory that can instruct a computer or another programmable data process-ing apparatus to work in a specific manner, so that the instructions stored in the computer-readable memory gen-erate an artifact that includes an instruction apparatus. The instruction apparatus implements a function specified in one or more processes in the flowcharts and/or in one or more blocks in the block diagrams.

These computer program instructions may be alterna-tively loaded onto a computer or another programmable data processing apparatus, so that a series of operations and steps are performed on the computer or the another programmable apparatus, to generate computer-implemented processing. Therefore, the instructions executed on the computer or the another programmable apparatus provide steps for imple-menting a function specified in one or more processes in the flowcharts and/or in one or more blocks in the block diagrams.

What is claimed is:

1. A communication method performed by one of a baseband unit (BBU) and a remote radio unit (RRU) of a distributed base station, comprising:
  splitting transmitted data between the BBU and the RRU into a plurality of data blocks, wherein each data block comprises N pieces of original data, and the N pieces of original data are N sign bits obtained through sampling process using a sampling rate;
  compressing the N pieces of original data based on an amount K of combined data and a data bit width L of the combined data to obtain N pieces of first data, wherein each piece of first data is a sign bit correspond-ing to a data bit width of B, where B is a non-integer greater than 0, and N, K, and L are positive integers, and K is less than N;
  determining K pieces of combined data based on B and the N pieces of first data, wherein the K pieces of combined data are K sign bits;
  packing the K pieces of combined data into a compressed package; and
  transmitting the compressed package through a common public radio interface (CPRI) between the BBU and the RRU.

2. The method of claim 1, the method further comprising:
  obtaining N pieces of second data based on the N pieces of original data, wherein each second data represents positive or negative feature of each of the N pieces of original data; and
  wherein the packing the K pieces of combined data comprises:
  packing the K pieces of combined data and the N pieces of second data into the compressed package.

3. The method of claim 1, wherein $\beta$ satisfies:

$$\beta = \frac{L * K}{N} + \sigma, \text{ wherein}$$

$$\sigma \in [-0.5, 0.5]$$

4. The method of claim 1, wherein each piece of first data satisfies:

$$Z_i = \left\lfloor \left( \frac{x_i}{C} * \lfloor 2^\beta - \lambda \rfloor \right) \right\rfloor,$$

wherein
  $Z_i$ represents first data with an index i in the N pieces of first data, $x_i$ represents an absolute value corresponding to original data with an index i in the N pieces of original data, C represents a compression factor used to compress the original data, $\lambda \geq 1$, and $i \in [0, N-1]$.

5. The method of claim 1, wherein each combined data satisfies:

$$E_j = \sum_{q=0}^{\frac{N}{K}-1} \lfloor 2^{\beta^* q} \rfloor * Z_{j^*K+q},$$

wherein
  $E_j$ represents combined data with an index j in the com-bined data, $Z_{j^*K+q}$ represents first data with an index j*K+q in the N pieces of first data, and $j \in [0, K-1]$.

6. The method of claim 1, wherein $\beta$ is 5.4, 6.4, 6.5, 6.8, or 7.5.

7. The method of claim 2, wherein $\beta$ satisfies:

$$\beta = \frac{L * K}{N} + \sigma, \text{ wherein}$$

$$\sigma \in [-0.5, 0.5].$$

8. An apparatus, comprising:
  one or more processors configured to execute instructions causing the apparatus to:
  split transmitted data between a baseband unit (BBU) and a remote radio unit (RRU) into a plurality of data blocks, wherein each data block comprises N pieces of original data, and the N pieces of original data are N sign bits obtained through sampling process using a sampling rate;
  compress the N pieces of original data based on an amount K of combined data and a data bit width L of the combined data to obtain N pieces of first data, wherein each piece of first data is a sign bit correspond-ing to a data bit width of $\beta$, $\beta$ is a non-integer greater than 0, N, K, and L are positive integers, and K is less than N;

determine K pieces of combined data based on $\beta$ and the N pieces of first data;

pack the K pieces of combined data into a compressed package; and transmit the compressed package through a common public radio interface (CPRI) between the BBU and the RRU.

9. The apparatus of claim 8, wherein the instructions are executed to further cause the apparatus to:

obtain N pieces of second data based on the N pieces of original data, wherein each second data represents positive or negative feature of each of the N pieces of original data; and wherein the instructions are executed to further cause the apparatus to pack the N pieces of second data together with the K pieces of combined data into the compressed package.

10. The apparatus of claim 8, wherein 8 satisfies:

$$\beta = \frac{L * K}{N} + \sigma, \text{ wherein}$$

$$\sigma \in [-0.5, 0.5].$$

11. The apparatus of claim 8, wherein each piece of first data satisfies:

$$Z_i = \left\lfloor \left( \frac{x_i}{C} * \lfloor 2^\beta - \lambda \rfloor \right) \right\rfloor,$$

wherein $Z_i$ represents first data with an index i in the N pieces of first data, $x_i$ represents an absolute value corresponding to original data with an index i in the N pieces of original data, C represents a compression factor used to compress the original data, $\lambda \geq 1$, and $i \in [0,N-1]$.

12. The apparatus of claim 8, wherein each combined data satisfies:

$$E_j = \sum_{q=0}^{\frac{N}{K}-1} \lfloor 2^{\beta * q} \rfloor * Z_{j*K+q},$$

wherein $E_j$ represents combined data with an index j in the combined data, $Z_{j*K+q}$ represents first data with an index j*K+q in the N pieces of first data, and $j \in [0,K-1]$.

13. The apparatus of claim 8, wherein $\beta$ is 5.4, 6.4, 6.5, 6.8, or 7.5.

14. The apparatus of claim 9, wherein $\beta$ satisfies:

$$\beta = \frac{L * K}{N} + \sigma, \text{ wherein}$$

$$\sigma \in [-0.5, 0.5].$$

15. A non-transitory computer readable medium storing instructions that are executable by a computer, the instructions comprising instructions for:

splitting transmitted data between a baseband unit (BBU) and a remote radio unit (RRU) into a plurality of data blocks, wherein each data block comprises N pieces of original data, and the N pieces of original data are N sign bits obtained through sampling process using a sampling rate;

compressing the N pieces of original data based on an amount K of combined data and a data bit width L of the combined data to obtain N pieces of first data, wherein each piece of first data is a sign bit corresponding to a data bit width of $\beta$, $\beta$ is a non-integer greater than 0, N, K, and L are positive integers, and K is less than N;

determining K pieces of combined data based on $\beta$ and the N pieces of first data;

packing the K pieces of combined data into a compressed package; and transmitting the compressed package through a common public radio interface (CPRI) between the BBU and the RRU.

16. The non-transitory computer readable medium of claim 15, wherein the instructions further comprise instructions for:

obtaining N pieces of second data based on the N pieces of original data, wherein each second data represents positive or negative feature of each of the N pieces of original data; and wherein the packing the K pieces of combined data comprises:

packing the K pieces of combined data and the N pieces of second data into the compressed package.

17. The non-transitory computer readable medium of claim 15, wherein $\beta$ satisfies:

$$\beta = \frac{L * K}{N} + \sigma, \text{ wherein}$$

$$\sigma \in [-0.5, 0.5].$$

18. The non-transitory computer readable medium of claim 15, wherein each piece of first data satisfies:

$$Z_i = \left\lfloor \left( \frac{x_i}{C} * \lfloor 2^\beta - \lambda \rfloor \right) \right\rfloor,$$

wherein $Z_i$ represents first data with an index i in the N pieces of first data, $x_i$ represents an absolute value corresponding to original data with an index i in the N pieces of original data, C represents a compression factor used to compress the original data, $\lambda \geq 1$, and $i \in [0,N-1]$.

19. The non-transitory computer readable medium of claim 15, wherein each combined data satisfies:

$$E_j = \sum_{q=0}^{\frac{N}{K}-1} \lfloor 2^{\beta * q} \rfloor * Z_{j*K+q},$$

wherein $E_j$ represents combined data with an index j in the combined data, $Z_{j*K+q}$ represents first data with an index j*K+q in the N pieces of first data, and $j \in 0,K-1$.

20. The non-transitory computer readable medium of claim 15, wherein $\beta$ is 5.4, 6.4, 6.5, 6.8, or 7.5.

* * * * *